Feb. 19, 1946.    O. W. ANDERSON    2,395,242
WORK CLAMP
Filed Oct. 2, 1943    2 Sheets-Sheet 1
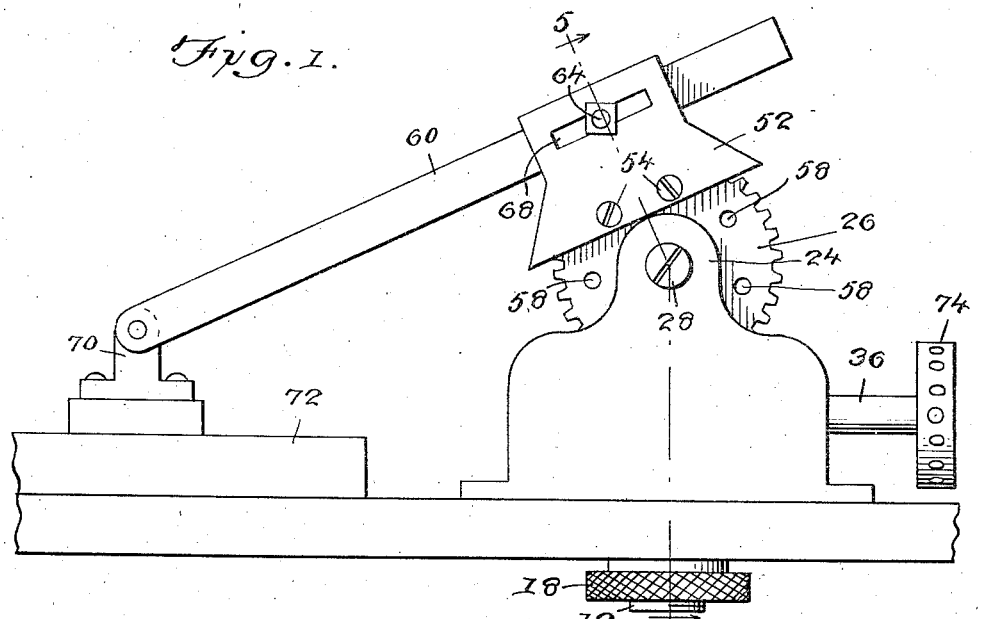
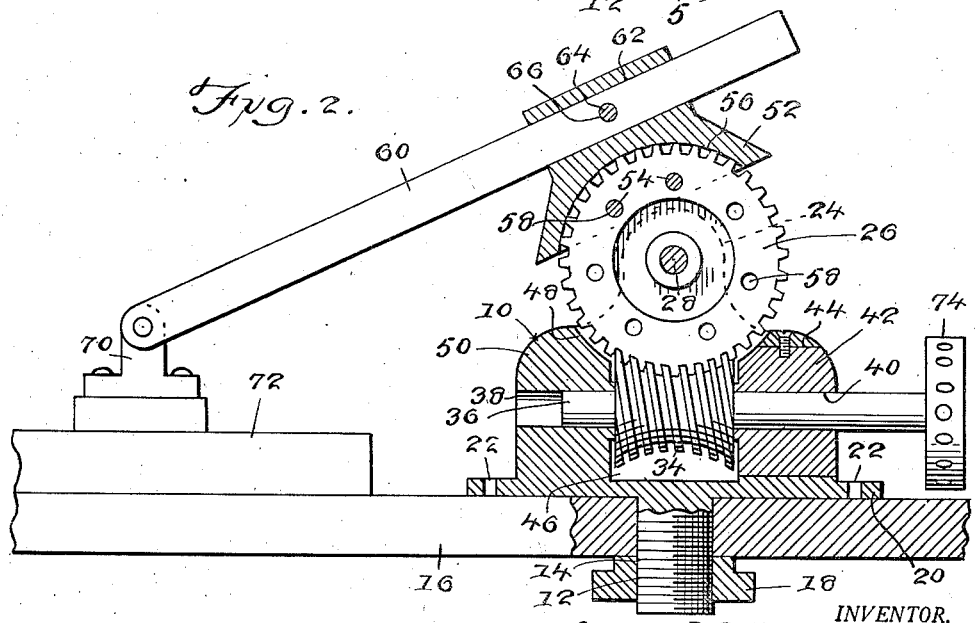
INVENTOR.
Oscar W. Anderson
BY
Victor J. Evans & Co.
ATTORNEYS Feb. 19, 1946. O. W. ANDERSON 2,395,242
WORK CLAMP
Filed Oct. 2, 1943 2 Sheets-Sheet 2

INVENTOR.
Oscar W. Anderson
BY
Victor J. Evans & Co.
ATTORNEYS

Patented Feb. 19, 1946

2,395,242

UNITED STATES PATENT OFFICE 2,395,242

WORK CLAMP

Oscar W. Anderson, Glendale, N. Y.

Application October 2, 1943, Serial No. 504,772

2 Claims. (Cl. 144—290)

My invention relates to work holding means, and has among its objects and advantages the provision of an improved clamp.

In the accompanying drawings:

Figure 1 is a side view;

Figure 2 is a similar view partly in section;

Figure 3:
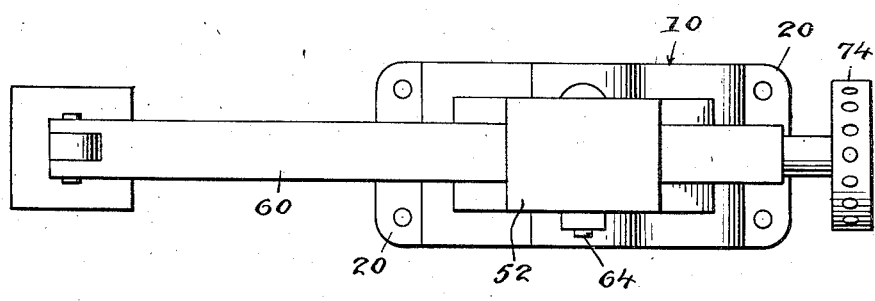
Figure 3 is a top view.
Figure 4:
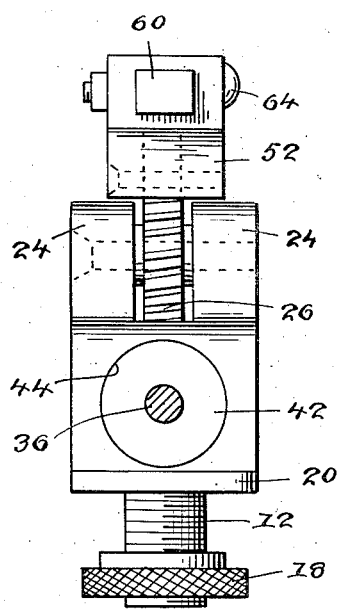
Figure 4 is an end view.
Figure 5:
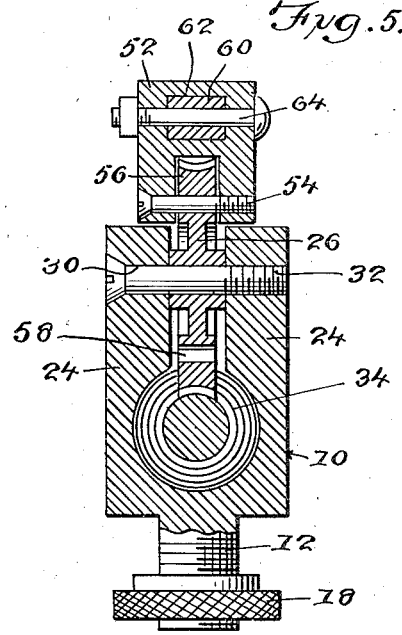
Figure 5 is a sectional view taken substantially along the line 5—5 of Figure 1.

In the embodiment selected for illustration, I make use of a body 10 having a shank 12 which may be placed in a bore 14 in a support 16, such as work bench or drill press table.

A nut 18 is threaded on the shank to engage the bottom face of the support 16 to hold the body 10 firmly against the support. This body is provided with flanges 20 having openings 22 for the reception of nails or screws should additional fastening means be desirable.

Two upstanding and spaced flanges 24 are formed on the body 10. Between the flanges 24 is placed a worm wheel 26, which is rotatably mounted on a screw 28 extending through an opening 30 in one flange 24 and threadedly connected at 32 in the other flange. Meshing with the worm wheel 26 is a worm 34 fixed to a shaft 36 rotatably supported in a bore 38 in the body 10 and in a bore 40 in a plug 42.

The plug 42 fits in a bore 44 in the body 10, which bore is of such diameter as to permit the worm 34 to be inserted therethrough when placed in the cavity 46 in the body 10. A slot 48 in the body brings the worm wheel 26 into meshing relationship with the worm 34. Axial movement of the worm 34 is prevented by the wall 50 of the body and the inner end of the plug 42.

To the worm wheel 26 is secured a body 52 by screws 54. This body is provided with a groove 56 receiving a peripheral margin of the worm wheel 26 so that the screws 54 may be passed through openings 58 in the worm wheel. A large number of openings 58 is made in the worm wheel to permit the body to be shifted to different positions should the worm wheel and the worm become objectionally worn in spots.

A clamp bar 60 is slidable in an opening 62 in the body 52. A fastening bolt 64 is passed through an opening 66 in the bar 60 and through slots 68 in the body 52 so that the bar may be adjusted for length and made secure in desired positions through tightening of the bolt. To one end of the bar 60 is pivotally connected a depending clamp shoe 70 engageable with the work 72 to clamp the latter firmly upon the support 16. Work clamping pressure is attained through rotation of the shaft 36, as through the medium of a handwheel 74.

The clamp shoe 70 exerts downward pressure on the work so as to hold the work firmly against the support. This eliminates the tendency of the work to rotate on the support, as happens in cases where the work is improperly clamped to the support. The worm wheel and the worm locks against accidental rotation, thereby maintaining the shoe in pressure engagement with the work.

Without further elaboration, the foregoing will so fully illustrate my invention, that others may, by applying current knowledge, readily adapt the same for use under various conditions of service.

I claim:

1. A work clamp comprising a support, a first gear rotatably mounted on the support, a body mounted on the gear for adjustment with relation thereto an elongated opening in said body, a clamp bar carried by the body in said elongated opening, means for adjustably securing said clamp bar in said body, a clamp shoe carried by the clamp bar, and a second gear meshing with the first gear to rotate the latter and the clamp bar to bring the clamp shoe into clamping engagement with the work.

2. A work clamp comprising a support, a first gear rotatably mounted on the support, a body recessed to receive a peripheral portion of the gear an elongated opening in said body adjacent to but spaced from said recess, means of securing the body to the gear for rotation therewith and for adjustment with relation thereto, a clamp bar mounted in the elongated opening in the body for adjustment in the direction of its length thereon, a clamp shoe carried by the clamp bar, and a second gear meshing with the first gear to rotate the latter and the clamp bar to bring the clamp shoe into clamping engagement with the work.

OSCAR W. ANDERSON.